(12) United States Patent
Douniwa

(10) Patent No.: US 6,308,323 B1
(45) Date of Patent: Oct. 23, 2001

(54) APPARATUS AND METHOD FOR COMPILING A PLURALITY OF INSTRUCTION SETS FOR A PROCESSOR AND A MEDIA FOR RECORDING THE COMPILING METHOD

(75) Inventor: Kenichi Douniwa, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/320,730

(22) Filed: May 27, 1999

(30) Foreign Application Priority Data

May 28, 1998 (JP) .............................................. P10-147057

(51) Int. Cl.[7] ...................................................... G06F 9/45
(52) U.S. Cl. .................................................... 717/9; 717/4
(58) Field of Search ................... 717/4, 5, 6, 7, 717/8, 9; 712/1, 208, 209, 43, 42; 703/22, 27, 26

(56) References Cited

U.S. PATENT DOCUMENTS

| | | | |
|---|---|---|---|
| 5,604,905 | * | 2/1997 | Tevanian et al. ..................... 395/706 |
| 5,787,285 | * | 7/1998 | Lanning ................................ 395/704 |
| 5,815,721 | * | 9/1998 | Benitez ................................. 395/709 |
| 5,835,773 | * | 11/1998 | Dunn ..................................... 395/705 |
| 5,835,775 | * | 11/1998 | Washington et al. ................. 395/706 |
| 5,854,913 | * | 12/1998 | Goetz et al. .......................... 712/210 |
| 5,987,259 | * | 11/1999 | Goebel .................................. 395/709 |
| 6,049,668 | * | 4/2000 | Smith et al. .......................... 395/705 |
| 6,067,575 | * | 5/2000 | McManis et al. .................... 709/300 |
| 6,085,307 | * | 7/2000 | Evory et al. ............................ 712/31 |

OTHER PUBLICATIONS

Hayashida et al., "Optimizing metod of C compiler for TRON architecture", IEEE, 1992, pp 70–76.*

Cole, "integrated tools ease design", Electronic Engineering Times, Dec. 1995, pp 24.*

\* cited by examiner

*Primary Examiner*—Kakali Chaki
(74) *Attorney, Agent, or Firm*—Finnegan, Henderson, Farabow, Garrett & Dunner, L.L.P.

(57) ABSTRACT

An apparatus and method for compiling a source program for a processor having a plurality of different instruction sets at high speed by selecting an optimum instruction set. The compiling method comprises dividing a source program into a plurality of modules according to a predetermined unit, compiling the respective modules with respective ones of the plurality of different instruction sets, providing data for evaluating an efficient compiling process based upon the module compilations with the respective instruction sets, selecting an optimum instruction set among the plurality of different instruction sets by comparing the evaluation data, and inserting an instruction set changing command at a necessary portion for changing the instruction set.

11 Claims, 7 Drawing Sheets

Fig. 4

```
main ( )
{
    ......
    function 1 ( );
    Changing command         ← Insert
    function 2 ( );
    Changing command         ← Insert
} function 1 ( )
{
    int    i;
    for  (i = 0, i < end;  i ++) {
    ......
    }
} function 2 ( )
{
    int    i;
    j = 0;
    while   (i < end ) {
    ......
    }
}
```

Compile by the instruction set 1

Compile by the instruction set 1

Compile by the instruction set 2

Fig. 5

```
main ()
{
    int   i;  j;
    for  (i = 0, i < 100;  i++) {
        for  (i = 0, i < 100;  i++) {
            .....
            .....
        }
    }                                    ⎬ Compile by
                                           the instruction set 1

[Changing command]         ← Insert for  (i = 0, i < 100;  i++) {        ⎬ Compile by
        .....                              the instruction set 2
        .....
    }
}
```

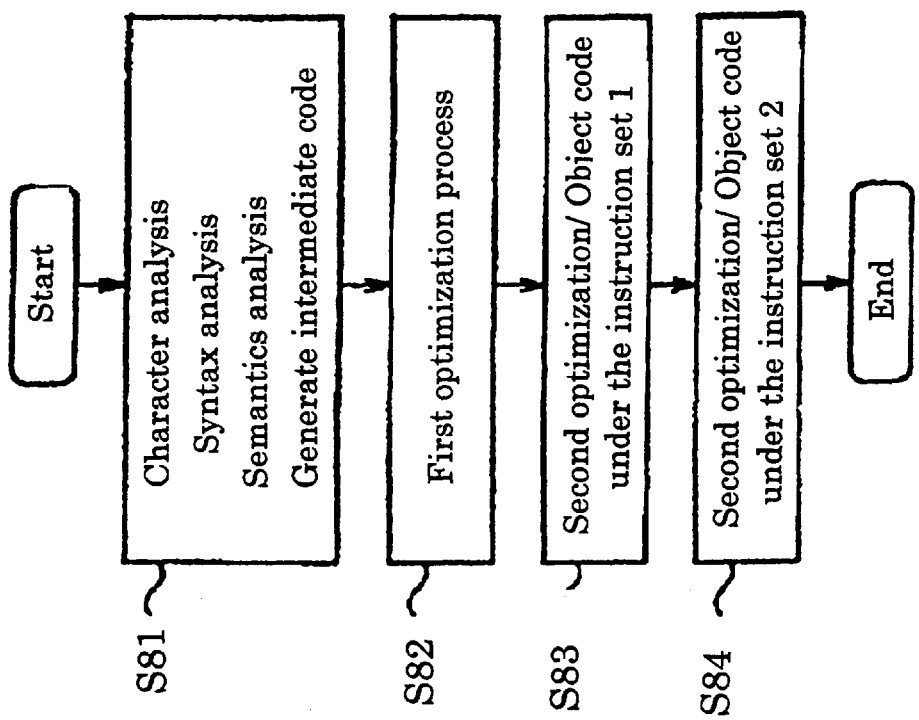

APPARATUS AND METHOD FOR COMPILING A PLURALITY OF INSTRUCTION SETS FOR A PROCESSOR AND A MEDIA FOR RECORDING THE COMPILING METHOD

BACKGROUND OF THE INVENTION

1. Field of the Invention

The present invention relates to an apparatus and method for compiling a plurality of instruction sets for a processor. More particularly, the present invention relates to a compiling apparatus and method for compiling a plurality of instruction sets for a processor which has a function for selecting the most appropriate instruction set for achieving system efficiency.

The present invention further relates to a programmed media for recording the compiling method.

2. Discussion of the Related Art

Recent development of semiconductor technology provides a higher functional microprocessor, memory or a peripheral controlling LSI at a lower cost. This permits a higher functioned personal computer at a lower price. In particular, remarkable developments have been achieved for a microprocessor for mainly controlling a computer.

A processing width for the microprocessor has advanced from 16 bits to 32 bit. Recently, a super-functional microprocessor having a processing width of more than 64 bits and an operating speed of more than 200 MHZ frequency has been developed. Consequently, it has become possible to produce a higher functioned computer that loads a substantial operating system (OS) for using a lot of commercial software.

Among these higher functioned microprocessors, there is one type of microprocessor that has a plurality of instruction sets comprised of different lengths of instruction codes, i.e., 16 bits and 32 bits. In a compiling process for such a microprocessor having a plurality of instruction sets, a programmer needs to judge which one of the plurality of instruction sets is most appropriate for achieving the best efficiency for the system.

However, a conventional compiling method does not include information enabling advance selection of the most appropriate instruction set. In actual practice, a programmer evaluates performance after one of the plurality of instruction sets has once compiled. And if it does not meet to the required performance level, a further compiling process using another instruction set is executed to examine which instruction set is the most appropriate for compiling.

Thus, the conventional compiling process is a burdensome for a programmer. Further, it takes a long time to compile a plurality of instruction sets. Thus, the conventional process has the drawback of such inefficient compiling.

SUMMARY OF THE INVENTION

Apparatus and method according to the present invention solve the aforementioned problems and defects of a conventional compiling method for selecting the most appropriate instruction set among a plurality of them.

For achieving these and other advantages and in accordance with the present invention, there is provided a compiling method for a processor having a plurality of different instruction sets. The method comprises dividing a source program into a plurality of modules in accordance with a predetermined unit, compiling the respective modules with the respective ones of the plurality of instruction sets; providing data for evaluating performance and code size based upon the module compilations with the respective ones of the plurality of different instruction sets; and selecting an optimum instruction set among the plurality of different instruction sets by comparing the evaluation data.

Also in accordance with the present invention, there is provided a compiling method for a processor having a plurality of different instruction sets. The method comprises generating an intermediate code from a source program, and generating an object code by optimizing the intermediate code. Further, the generating of an intermediate code includes processing the source program by a plurality of analyzing steps. The method further includes executing an optimizing process that does not depend upon an instruction set for the intermediate code and storing a result of the optimizing process, and executing an optimizing process that depends upon the instruction set for generating an object code for each of the plurality of different instruction sets.

Further in accordance with the present invention there is provided compiling apparatus for a processor having a plurality of different instruction sets. The apparatus comprises means for dividing a source program into a plurality of modules in accordance with a predetermined unit, means for compiling the respective modules with respective ones of the plurality of different instruction sets, means for providing data for evaluating performance and code size based upon the module compilations with the respective ones of the plurality of different instruction sets and means for selecting an optimum instruction set among the plurality of different instruction sets by comparing the evaluation data.

Additionally in accordance with the present invention, there is provided a storage media for storing a compiling method for a processor having a plurality of different instruction sets comprising dividing a source program into a plurality of modules in accordance with a predetermined unit, compiling the respective modules with respective ones of the plurality of different instruction sets, providing data for evaluating performance and code size based upon the module compilations with the respective ones of the plurality of different instruction sets, selecting an optimum instruction set among the plurality of different instruction sets by comparing the evaluation data, inserting an instruction set changing command at a necessary portion for changing the instruction set, and outputting an object code in accordance with the selection.

BRIEF DESCRIPTION OF THE DRAWINGS

A more complete appreciation of the present invention and many of the attendant advantages will be realized as the same becomes better understood by reference to the following detailed description when considered in connection with the accompanying drawings in which like reference numerals designate identical or corresponding parts throughout the several views.

FIGS. 4 and 5 each illustrate an exemplary program in which changing instructions are used;

FIG. 7 is a flow chart illustrating an efficient compiling process for a plurality of instruction sets according to the present invention.

DESCRIPTION OF THE PREFERRED EMBODIMENTS

Reference will now be made in detail to the preferred embodiments of the present invention, examples of which are illustrated in the accompanying drawings.

Compiling apparatus and method consistent with the present invention can provide selecting information for the most appropriate instruction set prior to executing the program, for reducing the burden on a programmer. Also, compiling apparatus and method consistent with the present invention can automatically select the most efficient instruction set among different sets of instructions, and can select the most efficient instruction set among different sets of instruction at a high speed.

A compiler for a processor that has a plurality of instruction sets according to the present invention comprises following steps. First, a source program is divided into a plurality of modules according to a predetermined unit, e.g., a function or a smaller block. Each of the divided modules is compiled and the respective code sizes and estimated execution cycles are calculated. In accordance with the result of the calculation, an optimum instruction set is selected for compiling the respective modules. For changing the instruction set, an instruction set changing command is automatically inserted. In compiling the source program, common processes that do not depend upon the instruction set are initially executed, then an optimizing process that depends upon the instruction set and an object code outputting process are executed in accordance with the respective instruction sets.

Figure 1:
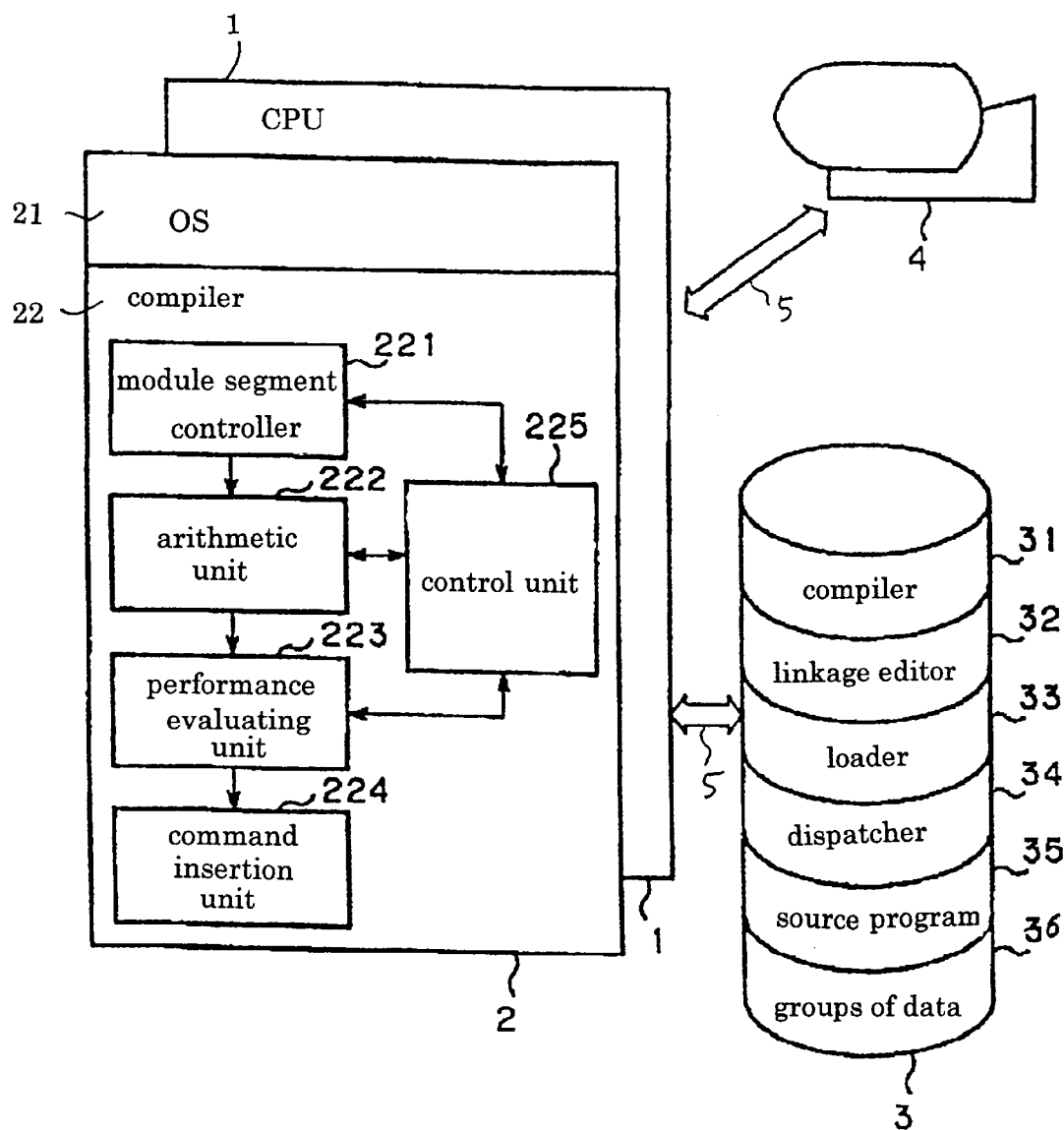
FIG. 1 is a block diagram illustrating the components of the computer system for practicing a compiling method according to the present invention.

FIG. 1 illustrates a computer system for applying a compiling method according to the present invention. The computer system comprises a CPU 1, a main storage 2, a large capacity external storage 3 and a keyboard display device 4 as a graphic user interface (GUI). The two storages 2 and 3, and the keyboard display device 4 are commonly coupled to the CPU 1 through a system bus 5.

In the main storage 2, an OS 21 and a resident compiler 22 are provided. In the resident compiler 22, a module segment controller 221, an arithmetic unit 222, a performance evaluating/reporting unit 223, a command insertion unit 224 for changing the instruction set to be executed, and a control unit 225 for the compiler and the compiling process, are allotted.

The module segment controller 221 divides a source code into functions, or blocks that are smaller than a function. Further, the module segment controller 221 instructs compiling the source code for every function or block.

The arithmetic unit 222 calculates a code size and estimates an execution cycle for an instruction set.

The performance evaluating/reporting unit 223 compares the results of the calculations of the code size and estimation of the execution cycle for the instruction set in the arithmetic unit 222 and displays the results on the display device 4 as a GUI.

The instruction set changing command insertion unit 224 automatically inserts an instruction set changing command at necessary positions depending upon the results of the performance evaluating/reporting unit 223.

The compiler and the compile process control unit 225 serves as a compiling control center for executing all steps for compiling a source code. Thus, the compiler and the compile process control unit 225 executes a character analysis, a syntax analysis and a semantics analysis. Further, it generates an intermediate code file and optimizes non-depending instruction sets. Then it optimizes each instruction set and generates an object code.

Many of necessary programs for generating an object code from a source code are stored in the large capacity of external storage 3. Thus, a non-resident compiler 31, a linkage editor 32, a loader 33, a dispatcher 35, source programs 35 and groups of data 36 are allotted in the external storage 3.

Figure 2:
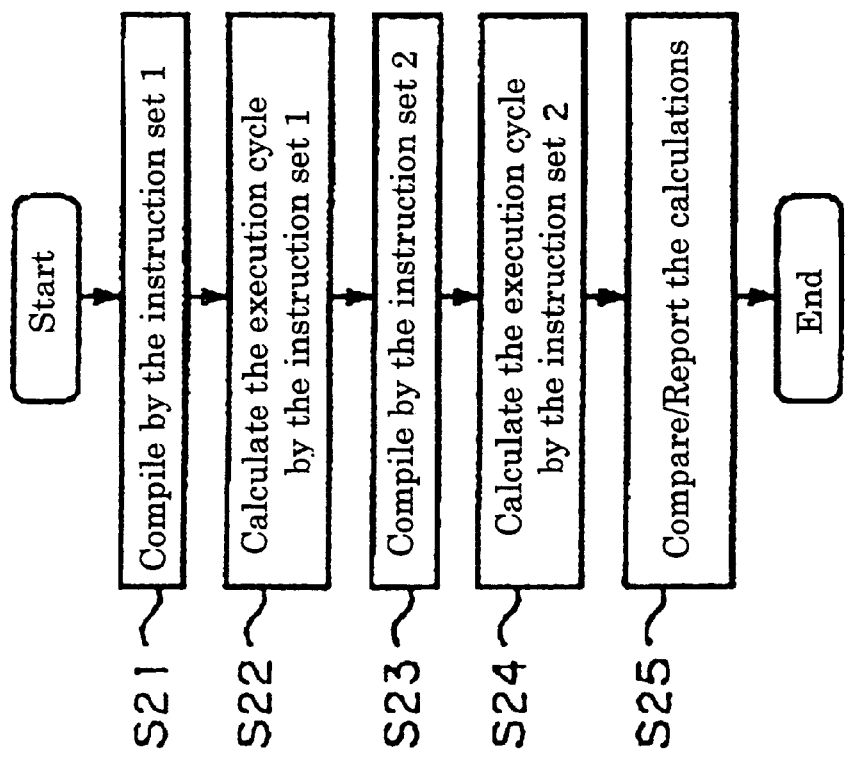
FIG. 2 is a flow chart illustrating a compiling process for a plurality of instruction sets applied to the computer system of FIG. 1 according to the present invention.

The flowchart shown in FIG. 2 explains a compiling method for the plurality of instruction sets for using the computer system in FIG. 1. To simplify the explanation, the computer system is assumed to use two kinds of instructions sets, e.g., 16 bits and 32 bits.

Firstly, with access to the resident compiler 22 in the main storage 2, the non-resident compiler 31 in the external storage 3 reads out the source code 35 from the external storage 3. The read out of the source code 35 is divided into function units or block units by the module segment controller 221.

The modules of the read out source code are compiled under a first instruction set, i.e., a 32 bit instruction set, and are monitored by the compiler and the compile process control unit 225 in the resident compiler 22 (step S21).

The performance evaluating/reporting unit 223 in the resident compiler 22 calculates the code size of the module and estimates the number of execution cycles (step S22).

Further, the modules of the read out source code are compiled under a second instruction set, i.e., a 16 bit instruction set, and are monitored by the compiler and the compile process control unit 225 (step S23). Then, the arithmetic unit 222 calculates the code size and estimates the number of the execution cycles (step S24).

The performance evaluating/reporting unit 223 in the resident compiler 22 compares the results of the calculations and estimation of the respective instruction sets provided by the arithmetic unit 222 and the results of the comparison are displayed on the display unit 4 as the GUI (step S25).

For determining which instruction set of 32 bits or 16 bits is more suitable for the performance and the code size, the module segment controller 221 changes the unit of the source code from a total program to the respective blocks of functions or loops. The changing information to the module segment controller 221 is provided from a compiling option set in the compiler and the compile process control unit 225.

According to the above-mentioned steps, judging information is displayed on the display unit 4 for judging whether the first 32 bit instruction set or the second 16 bit instruction set is more efficient for the performance and the code size.

Figure 3:
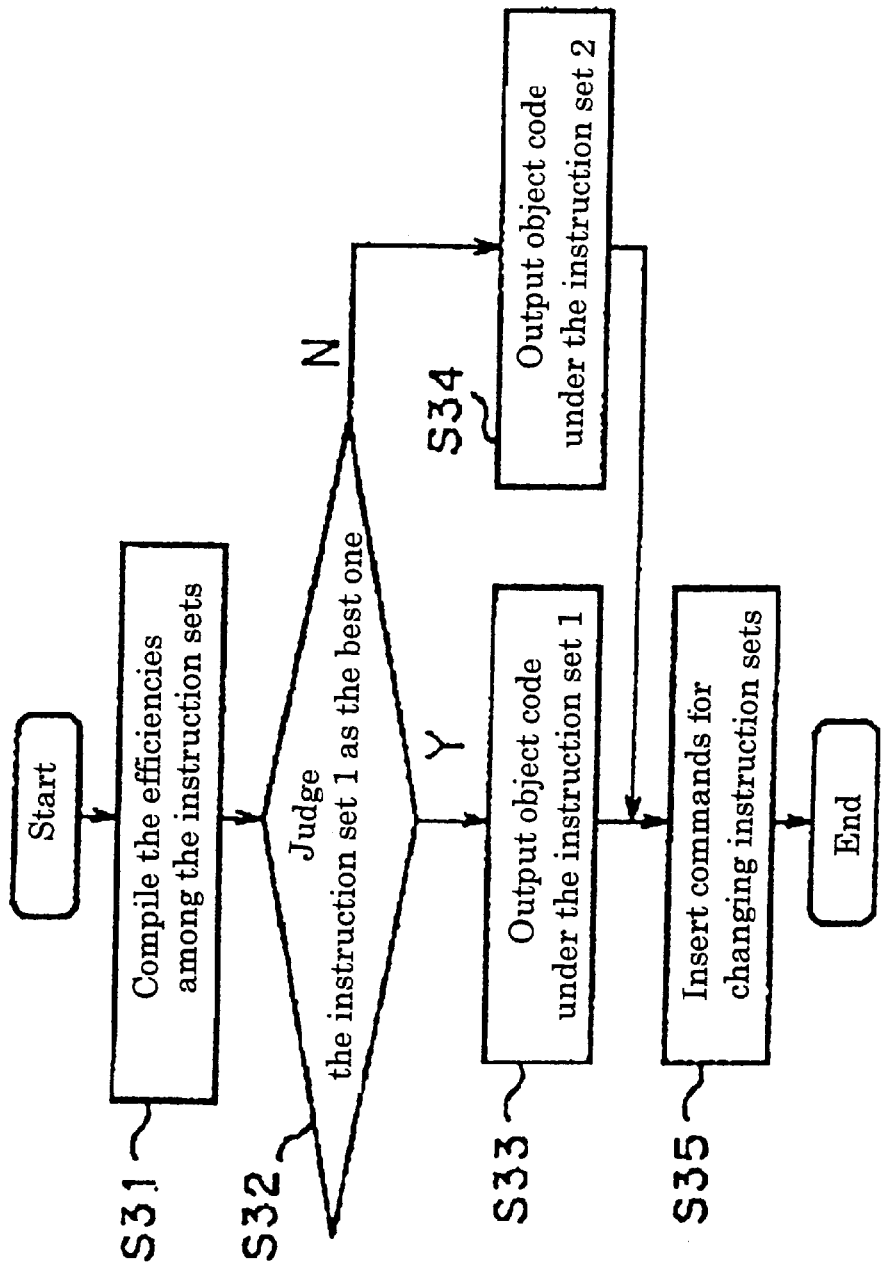
FIG. 3 is a flow chart illustrating a compiling process for automatically selecting an efficient instruction set succeeding the process in FIG. 2.

As explained in the flowchart of FIG. 3, the performance evaluating/reporting unit 223 in the resident compiler 22 judges that either the first 32 bit instruction set or the second 16 bit instruction set is more efficient for the performance and the code size (step S31). Next, it is judged whether the first instruction set of 32 bits is more efficient. (step S32).

Assuming the first 32 bit instruction set is judged more efficient, the performance evaluating/reporting unit 223 instructs the compiler and the compile process control unit 225 to perform the compilation under the first instruction set. Then, the object code under the first instruction set is outputted (step S33).

If the second instruction set of 16 bits is judged to be more efficient, the performance evaluating/reporting unit 223 instructs the compiling process control unit to perform the compilation under the second instruction set. Then, the object code under the second instruction set is outputted (step S34).

In this case, the unit size of the source code for the purpose of comparing the efficiency is changed from a whole size of the program to a functional block size of the program by the compiling option. This enables each module of the program to use a different instruction set.

Accordingly, the instruction set changing command insertion unit inserts an instruction set changing command at every necessary portion for changing the instruction set in cooperation with the compiler and compile process control unit 224 (step S35).

Since the efficient instruction set is automatically selected by the method according to the present invention, the operator's burden for determining the best instruction set for the performance and the code size is greatly reduced.

FIG. 4 illustrates a sample program written in the C language in which two instruction set changing commands are used. In FIG. 4, the program functions of "main ( )" and "function_1( )" select the first instruction set for compiling. The program function of "function_2( )" is to select the second instruction set for compiling. In this example, before and after calling the function of "function_2( )", the changing commands are inserted.

FIG. 5 illustrates another sample program written in the C language in which one instruction set changing command is used. In this example, the first half block is compiled by the first instruction set and the second half block is compiled by the second instruction set. Accordingly, after the first half block, the changing command is inserted.

Figure 6:
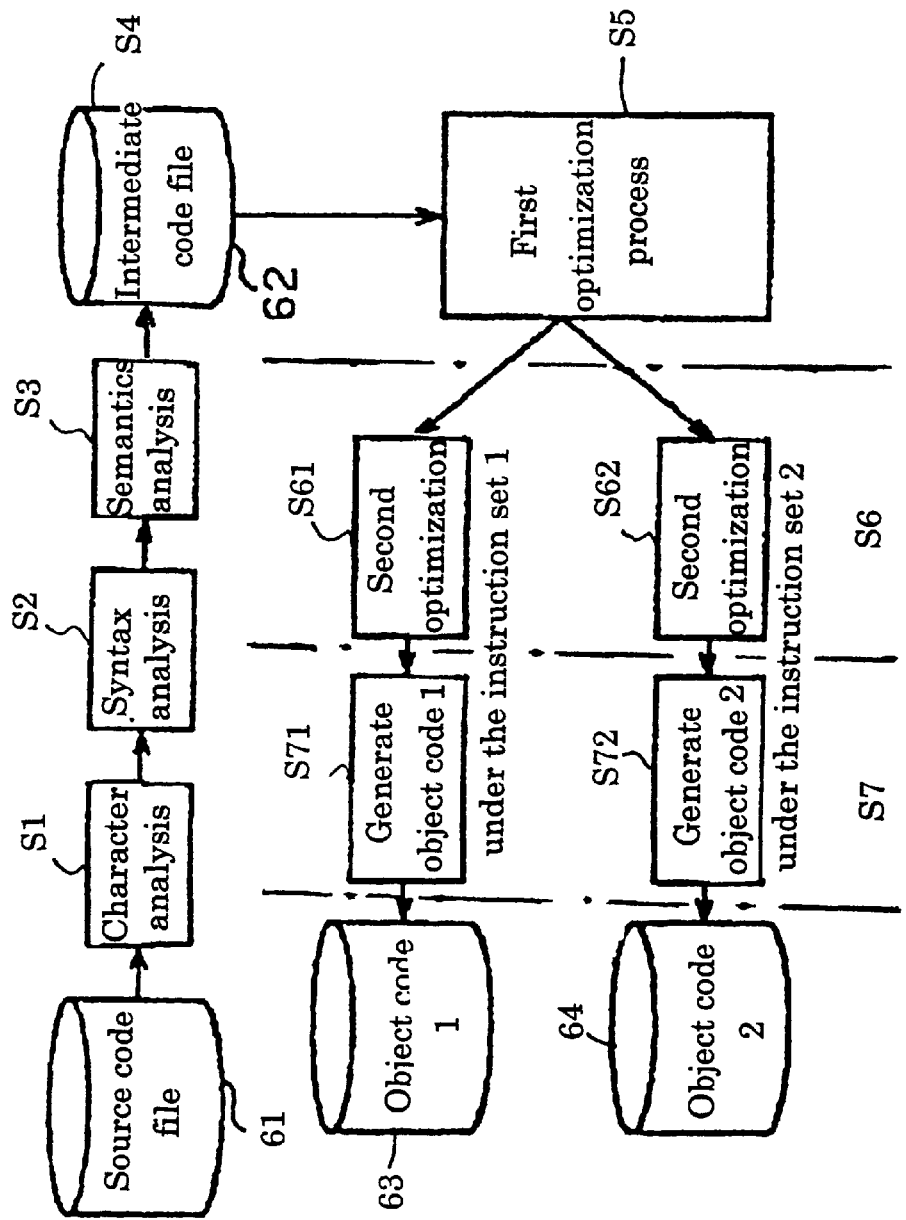
FIG. 6 is a block diagram illustrating a process for effectively compiling a plurality of instruction sets according to the present invention.

With reference to FIGS. 6 and 7, a process for efficiently executing a compilation by using two instruction sets is explained.

FIG. 6 shows an efficient compiling process in which a source code is compiled to an object code through an intermediate code file. For performing the compilation, as an initial stage of compilation for the source code, a character analysis S1, a syntax analysis S2 and a semantics analysis S3 are executed for generating the intermediate code file S4. Then a first optimizing process S5 that does not depend upon the instructions set is executed. Then, the compiling process goes to a second optimizing process S6 that depends upon the instruction set, and an object code generating process S7.

In the second optimizing process S6 that depends upon the instruction set, an optimizing process S61 depending upon a first instruction set and an optimizing process S62 depending upon a second instruction set are independently executed. Consequently, the object code generating process is also divided into a generation of object code S71 under the first instruction set and a generation of object code S72 under the second instruction set.

In FIG. 6, it is required to execute the compilation process for the respective sets. This increases the total processing time for the compilation process. To reduce the total processing time, the method according to the present invention employs a common execution for the processes that does not depend upon the instruction set. Thus, the character analysis S1, the syntax analysis S2, the semantics analysis S3, the intermediate code file generation S4 and the first optimizing process S5 are commonly executed. The result for the common execution is stored for the compilation process for the respective instruction sets. Accordingly, after these common executions, the remaining processes only, i.e., the second optimizing process S6 and the object code generating process S7 are executed for the respective instruction sets.

Thus, as shown in the flowchart in FIG. 7, if the processor has two kinds of instruction sets, the source code file first executes the character analysis, the syntax analysis, the semantics analysis and the intermediate code file generation or storing the intermediate code file (step S81). Further, the first optimizing process S5 that does not depend upon the instruction set is executed and its result is stored in a memory or a disk 3 (FIG. 1) (step S82). Then, the optimizing process under the first instruction set is executed and its object code is generated (step S83). Similarly, the optimizing process under the second instruction set is executed and its object code is generated (step S84).

Accordingly, the process according to the present invention can obtain the two sets of object codes for the respective instruction sets in a shorter time than the conventional compilation process. These processes according to the present invention are executed by the compiling process control unit 225 in the resident compiler 22 (FIG. 1).

As explained above, the method according to the present invention is characterized in that a source program is segmented into a function or a module, and the segmented source code is complied under the respective instruction sets. Further the method is characterized in that a calculated execution cycle for each of the instruction sets is reported for judging which instruction sets would be selected for the performance and the code size. An instruction set changing command is automatically inserted at every necessary portion for changing of the instructions set.

Further, the method according to the present invention can execute a plurality of compilation processes by commonly executing the processes that are not depending upon the instruction set.

Obviously, numerous modifications and variations of the present invention are possible in light of the above teachings. It is therefore to be understood that, within the scope of the appended claims, the invention may be practiced otherwise than as specifically described herein.

What is claimed:

1. A compiling method for a processor having a plurality of different instruction sets, comprising:

dividing a source program into a plurality of modules according to a predetermined unit;

compiling the respective modules with respective ones of the plurality of different instruction sets;

providing data for evaluating performance and code size based upon the module compilations with the respective ones of the plurality of different instruction sets; and selecting an optimum instruction set among the plurality of different instruction sets by comparing the evaluation data.

2. The compiling method according to claim 1, further comprising:

outputting a result of the compilation by using the selected optimum instruction set; and automatically inserting an instruction set changing command at a necessary portion for changing the instruction set.

3. The compiling method according to claim 1, wherein:

the dividing includes dividing the source program according to a function unit.

4. The compiling method according to claim 1, wherein:
the dividing includes dividing the source program according to a block unit smaller than the function unit.

5. The compiling method according to claim 1, wherein:
the providing data for evaluating includes calculating at least two estimated execution cycles.

6. The compiling method according to claim 1, wherein:
the providing data for evaluating includes calculating code sizes.

7. A compiling method for a processor having a plurality of different instruction sets, comprising:
generating an intermediate code from a source program; and
generating an object code by optimizing the intermediate code;
wherein the generating of an intermediate code includes processing the source program by a plurality of analyzing steps;
the method further including
executing an optimizing process that does not depend upon an instruction set for the intermediate code and storing a result of the optimizing process; and
executing an optimizing process that depends upon the instruction set for generating an object code for each of the plurality of different instruction sets.

8. A compiling apparatus for a processor having a plurality of different instruction sets, comprising:
means for dividing a source program into a plurality of modules according to a predetermined unit;
means for compiling the respective modules with respective ones of the plurality of different instructions sets;
means for providing data for evaluating performance and code size based upon the module compilations with the respective ones of the plurality of different instructions sets; and
means for selecting an optimum instruction set among the plurality of different instruction sets by comparing the evaluation data.

9. The compiling apparatus according to claim 8, further comprising:
means for outputting a result of the compilation by using the selected optimum instruction set; and
means for automatically inserting an instruction set changing command at a necessary portion for changing the instruction set.

10. A compiling apparatus for a processor having a plurality of different instruction sets, comprising:
means for generating an intermediate code form a source program; and
means for generating an object code by optimizing the intermediate code;
wherein the intermediate code generating means includes means for processing the source program by a plurality of analyzing steps;
the apparatus further including:
means for executing an optimizing process that does not depend upon an instruction set for the intermediate code and for storing a result of the optimizing process; and
means for executing an optimizing process that depends upon the instruction set for generating an object code for each of the plurality of different instruction sets.

11. A storage media for storing a compiling method for a processor having a plurality of different instruction sets, comprising the steps of:
dividing a source program into a plurality of modules according to a predetermined unit;
compiling the respective modules with respective ones of the plurality of different instruction sets;
providing data for evaluating performance and code size based upon the module compilations with the respective ones of the plurality of different instructions sets;
selecting an optimum instruction set among the plurality of different instruction sets by comparing the valuation data;
inserting a selection at a necessary portion for changing the instruction set; and
outputting an object code in accordance with the instruction set changing command.

\* \* \* \* \*